(12) United States Patent
Zhang et al.

(10) Patent No.: US 11,967,825 B2
(45) Date of Patent: Apr. 23, 2024

(54) STABILITY CONTROL METHOD FOR VIRTUAL SYNCHRONOUS GENERATOR IN STRONG GRID BASED ON INDUCTANCE-CURRENT DIFFERENTIAL FEEDBACK

(71) Applicant: HEFEI UNIVERSITY OF TECHNOLOGY, Hefei (CN)

(72) Inventors: Xing Zhang, Hefei (CN); Zixuan Guo, Hefei (CN); Shaolong Chen, Hefei (CN); Yang Wang, Hefei (CN); Hailong Pan, Hefei (CN); Qian Gao, Hefei (CN); Zhen Xie, Hefei (CN)

(73) Assignee: HEFEI UNIVERSITY OF TECHNOLOGY, Hefei (CN)

( * ) Notice: Subject to any disclaimer, the term of this patent is extended or adjusted under 35 U.S.C. 154(b) by 298 days.

(21) Appl. No.: 17/642,240

(22) PCT Filed: Jun. 29, 2021

(86) PCT No.: PCT/CN2021/103147
§ 371 (c)(1),
(2) Date: Mar. 11, 2022

(87) PCT Pub. No.: WO2022/022202
PCT Pub. Date: Feb. 3, 2022

(65) Prior Publication Data
US 2022/0320865 A1    Oct. 6, 2022

(30) Foreign Application Priority Data

Jul. 30, 2020   (CN) .......................... 202010754946.2

(51) Int. Cl.
*H02J 3/24*      (2006.01)
*G05B 19/042*    (2006.01)

(52) U.S. Cl.
CPC .............. *H02J 3/24* (2013.01); *G05B 19/042* (2013.01); *G05B 2219/2639* (2013.01); *H02J 2203/20* (2020.01)

(58) Field of Classification Search
CPC ................................. H02J 3/24; G05B 19/042
See application file for complete search history.

(56) References Cited

U.S. PATENT DOCUMENTS

2019/0222026 A1    7/2019  Zhong

FOREIGN PATENT DOCUMENTS

| CN | 108258735 A | 7/2018 |
| CN | 108390396 A | 8/2018 |
| CN | 112271737 A | 1/2021 |

OTHER PUBLICATIONS

Lü Zhipeng, et al., Virtual Synchronous Generator and Its Applications in Micro-grid, Proceedings of the CSEE, 2014, pp. 2591-2603, vol. 34 No. 16.

(Continued)

*Primary Examiner* — Mark A Connolly
(74) *Attorney, Agent, or Firm* — Bayramoglu Law Offices LLC

(57) ABSTRACT

A stability control method for a virtual synchronous generator (VSG) in a strong grid based on an inductance-current differential feedback is provided. A grid-connected topological structure of a VSG using the control method includes a direct-current (DC)-side voltage source, a three-phase inverter, a three-phase grid impedance and a three-phase grid. By controlling the VSG and controlling the inductance-current differential feedback, the method suppresses the oscillation of the output power from the VSG in the strong grid and implements the stable operation of an inner-loop-free VSG in the strong grid, without adding the physical (Continued)

inductance, increasing the cost of the filter and additionally providing a grid-side current sensor.

3 Claims, 2 Drawing Sheets

(56) References Cited

OTHER PUBLICATIONS

Shang Lei, et al., Modeling and Improved Control of Virtual Synchronous Generators Under Symmetrical Faults of Grid, Proceedings of the CSEE, 2017, pp. 403-411, vol. 37 No.2.

Zhang Hui, et al., Impedance Matching Strategy for Parallel Virtual Synchronous Generators, Automation of Electric Power Systems, 2018, pp. 69-74, vol. 42 No. 9.

STABILITY CONTROL METHOD FOR VIRTUAL SYNCHRONOUS GENERATOR IN STRONG GRID BASED ON INDUCTANCE-CURRENT DIFFERENTIAL FEEDBACK

CROSS REFERENCE TO THE RELATED APPLICATIONS

This application is the national phase entry of International Application No. PCT/CN2021/103147, filed on Jun. 29, 2021, which is based upon and claims priority to Chinese Patent Application No. 202010754946.2, filed on Jul. 30, 2020, the entire contents of which are incorporated herein by reference.

TECHNICAL FIELD

The present disclosure belongs to the technical field of inverter control in distributed power generation and power electronics, and particularly relates to a stability control method for a virtual synchronous generator (VSG) in a strong grid based on an inductance-current differential feedback. The method implements the virtual series-connection inductance and the stable operation of the VSG in the strong grid by controlling the VSG and the inductance-current differential feedback. Without additionally increasing the hardware cost, the present disclosure suppresses the oscillation of the output power from the VSG in the strong grid, and achieves a better quality of electrical energy of the VSG in grid connection.

BACKGROUND

Current-controlled grid-connected inverters (GCIs) have been widely applied to the distributed power generation based on renewable energy sources for advantages such as rapid output power regulation speeds, high maximum power point tracking (MPPT) efficiencies, and high utilization rates for the renewable energy. However, since the current-controlled GCIs are typically configured for maximizing the output active powers, they cannot behave like the conventional synchronous generators (SGs) to support the voltage and frequency stabilities of the power grid, which is likely to introduce instability to the power grid. With the continuously increasing penetration rate of the renewable power generation, the power grids gradually appear as weak grids or even ultra-weak grids. The instability problems of the GCIs connected to weak grids have gained much attention among engineers and scholars, and VSGs are emerging.

The VSGs can simulate damping and inertia of the conventional SGs to provide support for frequencies and voltages of the power grids. According to the current research, it is conducive to the stability of renewable power generation under weak grids that the VSGs are connected to the power grids proportionally. In addition, different from the current-controlled GCIs, the VSGs are voltage-controlled and show satisfactory stability in the weak grids or even the ultra-weak grids.

However, because of the intermittency and volatility of renewable power generation, the strength of the power grid is actually constantly changing. Under the strong grid with low equivalent grid impedance, the output power of the voltage-controlled VSGs may oscillate, resulting in instability in the VSG grid-connected system.

Existing VSGs generally employ a control structure including an inner voltage loop and an inner current loop. For the VSGs with the inner voltage loop and the inner current loop, the virtual grid-side inductance control strategy is performed to realize a stable operation of the VSGs in the strong grids. The virtual grid-side inductance control strategy has to provide a grid-side current sensor, thus increasing a hardware cost of the inverters.

Besides, there have been inner-loop-free VSGs without the inner voltage loop and the inner current loop. The inner-loop-free VSGs are being widely used due to the simple control schemes, ease of implementation, and broadband impedances closer to the SGs in practice. However, without the inner voltage control loop, the inner-loop-free VSGs cannot employ the virtual grid-side inductance control strategy, and thus hardly achieve the stable operation in the strong grids. In order to implement the stable operation of the inner-loop-free VSGs in the strong grids, the filter inductance is typically added to cause the higher hardware cost of the inverters.

From the above two points, it is of great significance to enhance the stability of the inner-loop-free VSGs in the strong grids without adding a physical filter inductance or a grid-side current sensor. Presently, there have been a number of academic articles to analyze the stable operation of the VSGs in the strong grids and provide solutions, for example:

1. In the article titled "*Virtual Synchronous Generator and its Applications in Micro-Grid*", Proceedings of the Chinese Society of Electrical Engineering (CSEE), no. 16, pp. 2591-2603, 2014, the VSG and its applications in micro-grid are studied, the general forms and applications of the VSG are proposed, and the seamless switching method and damping-inertia design method of the VSG are provided. However, without an inner voltage loop, the inner-loop-free VSG used in the article cannot employ the virtual grid-side inductance control strategy and thus the output power of the VSG may oscillate in the strong grids.

2. The Chinese patent No. CN108390396A discloses a control method for a virtual synchronous generator based on a dynamic virtual impedance on Aug. 10, 2018. By designing the virtual impedance in the two-phase rotating coordinate system, the coupling degrees of the active power and reactive power output by the VSG in the dynamic process are reduced to suppress the power oscillation of the VSG in the dynamic process. However, this patent involves the VSG with the control structure including the inner voltage loop and the inner current loop, and the above control method is unavailable to the inner-loop-free VSG. In addition, the above control method needs to sample the grid-side current, and the grid-side current sensor is additionally provided to increase the hardware cost of the inverter.

3. In the article titled "*Modeling and Improved Control of Virtual Synchronous Generators under Symmetrical Faults of Grid*", Proceedings of the CSEE, no. 2, pp. 403-411, 2017, the model of the inner-loop-free VSG is established to demonstrate that the inner-loop-free VSG cannot suppress a short-circuit current in the symmetrical faults of the power grid, and the virtual grid-side resistance in the $\alpha\beta$ coordinate system is proposed to solve the over-limit fault current. In the article, the type inner-loop-free VSG is provided with an inductance filter (L-filter) to implement the virtual grid-side resistance control strategy without the inner voltage loop. However, because the virtual VSGs often employ the inductance-capacitance (LC) filter, the virtual grid-side resistance or virtual grid-side inductance control strategy cannot be implemented in the case of the existence of the inverter-side filter capacitance current.

To sum up, there are the following shortages for the stable operation of the existing VSGs in the strong grids:

1. The strength of the power grid actually fluctuates continuously. When the power grid fluctuates to the strong grid with a low equivalent grid impedance, the output power of the voltage-controlled VSG may oscillate, which will lead to instability in the VSG grid-connected system.

2. The existing stability control methods based on the virtual grid-side inductance for the VSGs in the strong grids are mainly directed to the VSGs employing the control structure including the inner voltage loop and the inner current loop, and inapplicable to solve the instability of the inner-loop-free VSGs in the strong grids.

3. For the existing operation methods based on the virtual grid-side inductance for the VSGs in the strong grids, there is a need to detect the grid-side current and additionally provide the current sensor to increase the cost of the sensor.

4. The virtual grid-side resistance or virtual grid-side inductance control strategy for the existing inner-loop-free VSGs can only be implemented on the inner-loop-free VSGs using the L-filter. However, since the virtual VSGs often employ the LC filter, the virtual grid-side resistance or virtual grid-side inductance control strategy cannot be implemented in the case of the existence of the inverter-side filter capacitance current.

Therefore, it is necessary to research the stability control methods for the inner-loop-free virtual VSGs in the strong grids without adding the physical filter inductance and additionally providing the grid-side current sensor.

SUMMARY

The present disclosure provides a stability control method for a VSG in a strong grid based on an inductance-current differential feedback. The method implements the virtual series-connection inductance and the stable operation of the VSG in the strong grid by controlling the VSG and controlling the inductance-current differential feedback. Without additionally increasing the hardware cost, the present disclosure suppresses the oscillation of the output power from the VSG in the strong grid, and achieves better quality of electrical energy of the VSG in grid connection.

The objective of the present disclosure is achieved as follows: The present disclosure provides a stability control method for a VSG in a strong grid based on an inductance-current differential feedback, which introduces the three-phase inductance-current differential feedback of the LC filter to the modulation voltage generating process during the control of the VSG, thereby implementing the virtual series-connection inductance and solving the unstable operation of the VSG in the strong grid.

Specifically, according to the stability control method for a VSG in a strong grid based on an inductance-current differential feedback provided by the present disclosure, a topological structure of a VSG using the control method includes a direct-current (DC)-side voltage source, a three-phase inverter, a three-phase grid impedance and a three-phase grid, where the DC-side voltage source is connected to the three-phase inverter, and the three-phase inverter is connected to the three-phase grid through the three-phase grid impedance; the three-phase inverter is composed of a three-phase full-bridge inverter circuit, a three-phase LC filter, a three-phase voltage-current sensor, and a three-phase inverter controller; the three-phase full-bridge inverter circuit is connected to the three-phase LC filter; the three-phase voltage-current sensor samples three-phase voltages of a filter capacitance and three-phase currents of a filter inductance in the three-phase LC filter, and transmits a sampled signal to the three-phase inverter controller; and the three-phase inverter controller performs control and computation, and outputs a pulse width modulation (PWM) signal to control the three-phase full-bridge inverter circuit;

the stability control method in the strong grid includes a round of computation for controlling the VSG and a round of computation for controlling the inductance-current differential feedback in each computation cycle $T_{compute}$ of the three-phase inverter controller, $T_{compute}=1/f_{compute}$, $f_{compute}$ being a computed frequency of the three-phase inverter controller; and the round of computation for controlling the VSG and the round of computation for controlling the inductance-current differential feedback include the following steps:

step 1: respectively labeling the capacitance and the inductance in the three-phase LC filter as an inverter-side filter capacitance and an inverter-side filter inductance, where the three-phase voltage-current sensor samples the three-phase voltages $U_a$, $U_b$, $U_c$ inverter-side filter capacitance and the three-phase currents $I_{La}$, $I_{Lb}$, $I_{Lc}$ of the inverter-side filter inductance, and transmits the sampled signal to the three-phase inverter controller;

step 2: obtaining, by the three-phase inverter controller, according to the three-phase voltages $U_a$, $U_b$, $U_c$ inverter-side filter capacitance in step 1, two-phase voltages $U_\alpha$, $U_\beta$ of the inverter-side filter capacitance in a static coordinate system through an equation for transforming the voltages in a three-phase static coordinate system into the voltages in a two-phase static coordinate system; and obtaining, by the three-phase inverter controller, according to the three-phase currents $I_{La}$, $I_{Lb}$, $I_{Lc}$ of the inverter-side filter inductance in step 1, two-phase currents $I_{L\alpha}$, $I_{L\beta}$ of the inverter-side filter inductance in the static coordinate system according to an equation for transforming the currents in the three-phase static coordinate system into the currents in the two-phase static coordinate system;

step 3: obtaining, by the three-phase inverter controller, according to the two-phase voltages $U_\alpha$, $U_\beta$ of the inverter-side filter capacitance in the static coordinate system and the two-phase currents $I_{L\alpha}$, $I_{L\beta}$ of the inverter-side filter inductance in the static coordinate system in step 2, an output active power P of the three-phase inverter and an output reactive power Q of the three-phase inverter through an equation for computing an instantaneous power, the equation for computing the instantaneous power being:

$$P=U_\alpha I_{L\alpha}+U_\beta I_{L\beta}$$

$$Q=U_\beta I_{L\alpha}-U_\alpha I_{L\beta}$$

step 4: labeling a reactive power axis as a q-axis and an active power axis as a d-axis; and obtaining, by the three-phase inverter controller, according to the two-phase voltages $U_\alpha$, $U_\beta$ of the inverter-side filter capacitance in the static coordinate system in step 2, a d-axis voltage $U_d$ of the inverter-side filter capacitance and a q-axis voltage $U_q$ of the inverter-side filter capacitance through an equation for transforming the voltages in the two-phase static coordinate system into the voltages in a two-phase rotating coordinate system, and obtaining a phase angle $\theta_{PLL}$ of an A-phase voltage of the inverter-side filter capacitance through a phase-locked equation of a phase-locked loop (PLL) in a single synchronous coordinate system;

step 5: obtaining, by the three-phase inverter controller, according to the output active power P of the three-phase inverter in step 3, an angle $\theta_m$ of a modulated wave output from the VSG, through an equation for computing an active power loop; and obtaining, by the three-phase inverter controller, according to the output reactive power Q of the three-phase inverter in step 3 and the d-axis voltage $U_d$ of the inverter-side filter capacitance in step 4, an amplitude $U_{m\_VSG}$ of the modulated wave output from the VSG, through an equation for calculating a reactive power loop, the equation for computing the active power loop being:

$$\theta_m = \frac{P_{set} - P + \omega_n^2 D_p}{J\omega_n s^2 + \omega_n D_p s}$$

the equation for computing the reactive power loop being:

$$U_{m\_VSG} = \frac{1}{K_q \times s}[D_q \times (U_{nAmp} - U_d) + (Q_{set} - Q)]$$

where, $P_{set}$ is a set value of the output active power of the three-phase inverter, $\omega_n$ is a rated angular frequency of the three-phase grid, $D_P$ is a frequency droop coefficient of the VSG, J is a virtual rotational inertia of the VSG, $U_{nAmp}$ is a rated phase voltage amplitude of the three-phase grid, $Q_{set}$ is a set value of the output reactive power of the three-phase inverter, $D_q$ is a voltage droop coefficient of the VSG, $K_q$ is an inertia coefficient for controlling the reactive power, and s is a Laplace operator;

step 6: obtaining, by the three-phase inverter controller, according to the amplitude $U_{m\_VSG}$ of the modulated wave output from the VSG and the angle $\theta_m$ of the modulated wave output from the VSG in step 5, output three-phase modulation voltages $U_{mA\_VSG}$, $U_{mB\_VSG}$, $U_{mC\_VSG}$ of the VSG through an equation for computing the modulated wave of the VSG, the equation for computing the modulated wave of the VSG being:

$$U_{mA\_VSG} = U_{m\_VSG} \times \cos(\theta_m)$$

$$U_{mB\_VSG} = U_{m\_VSG} \times \cos\left(\theta_m - \frac{2}{3}\pi\right)$$

$$U_{mC\_VSG} = U_{m\_VSG} \times \cos\left(\theta_m + \frac{2}{3}\pi\right)$$

step 7: obtaining, by the three-phase inverter controller, according to the three-phase currents $I_{La}$, $I_{Lb}$, $I_{Lc}$ of the inverter-side filter inductance in step 1, increments $\Delta U_{mA}$, $\Delta U_{mB}$, $\Delta U_{mC}$ of the three-phase modulation voltages due to a virtual series-connection inductance through an equation for computing the inductance-current differential feedback, the equation for computing the inductance-current differential feedback being:

$$\Delta U_{mA} = -sL_{vir}I_{La}$$

$$\Delta U_{mB} = -sL_{vir}I_{Lb}$$

$$\Delta U_{mC} = -sL_{vir}I_{Lc}$$

where, $L_{vir}$ is the virtual series-connection inductance;

step 8: computing, by the three-phase inverter controller, according to the output three-phase modulation voltages $U_{mA\_VSG}$, $U_{mB\_VSG}$, $U_{mC\_VSG}$ in step 6 and the increments $\Delta U_{mA}$, $\Delta U_{mB}$, $\Delta U_{mC}$ of the three-phase modulation voltages due to the virtual series-connection inductance in step 7, output three-phase modulation voltages $U_{mA}$, $U_{mB}$, $U_{mC}$ of the three-phase inverter with a following computational equation:

$$U_{mA} = U_{mA\_VSG} + \Delta U_{mA}$$

$$U_{mB} = U_{mB\_VSG} + \Delta U_{mB}$$

$$U_{mC} = U_{mC\_VSG} + \Delta U_{mC}, \text{ and}$$

step 9: controlling, by the three-phase inverter controller, according to the output three-phase modulation voltages $U_{mA}$, $U_{mB}$, $U_{mC}$ of the three-phase inverter in step 8, transmission of a PWM modulated wave and outputting the PWM signal, and controlling the three-phase full-bridge inverter circuit through the PWM signal to transmit output electrical energy of the three-phase inverter to the three-phase grid.

Preferably, the equation for transforming the voltages in the three-phase static coordinate system into the voltages in the two-phase static coordinate system in step 2 may be:

$$\begin{bmatrix} U_\alpha \\ U_\beta \end{bmatrix} = \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} U_a \\ U_b \\ U_c \end{bmatrix},$$

and the equation for transforming the currents in the three-phase static coordinate system into the currents in the two-phase static coordinate system in step 2 may be:

$$\begin{bmatrix} I_{L\alpha} \\ I_{L\beta} \end{bmatrix} = \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} I_{La} \\ I_{Lb} \\ I_{Lc} \end{bmatrix}.$$

Preferably, the equation for transforming the voltages in the two-phase static coordinate system into the voltages in the two-phase rotating coordinate system in step 4 may be:

$$U_d = \cos(\theta_{PLL\_Last}) \times U_\alpha + \sin(\theta_{PLL\_Last}) \times U_\beta$$

$$U_q = \sin(\theta_{PLL\_Last}) \times U_\alpha + \cos(\theta_{PLL\_Last}) \times U_\beta, \text{ and}$$

the phase-locked equation of the PLL in the single synchronous coordinate system in step 4 may be:

$$\theta_{PLL} = U_q \times \left(k_{p\_PLL} + \frac{k_{i\_PLL}}{s}\right) \times \frac{1}{s}$$

where, $\theta_{PLL\_Last}$ is a phase angle of an A-phase voltage of the inverter-side filter capacitance obtained through the phase-locked equation of the PLL in the single synchronous coordinate system in a last computation cycle, $k_{p\_PLL}$ is a coefficient of a proportional controller for the PLL in the single synchronous coordinate system, and $k_{i\_PLL}$ is a coefficient of an integral controller for the PLL in the single synchronous coordinate system.

Compared with the prior art, the present disclosure has the following beneficial effects:

1. The present disclosure considers the unstable operation of the VSG in the strong grid, and suppresses the oscillation of the output power from the VSG in the strong grid with the negative inductance-current differential scheme.

2. By only adding the virtual inductance rather than the physical inductance, the present disclosure suppresses the oscillation of the output power from the VSG in the strong grid, without increasing the cost of the filter.

3. The existing virtual inductance methods are mainly directed to the VSG employing a control structure including an inner voltage loop and an inner current loop, while the present disclosure meets the stability control requirement of the inner-loop-free VSG in the strong grid without the grid-side current sensor.

DETAILED DESCRIPTION OF THE EMBODIMENTS

The embodiments of the present disclosure will be specifically described below with reference to the accompanying drawings.

Figure 1:
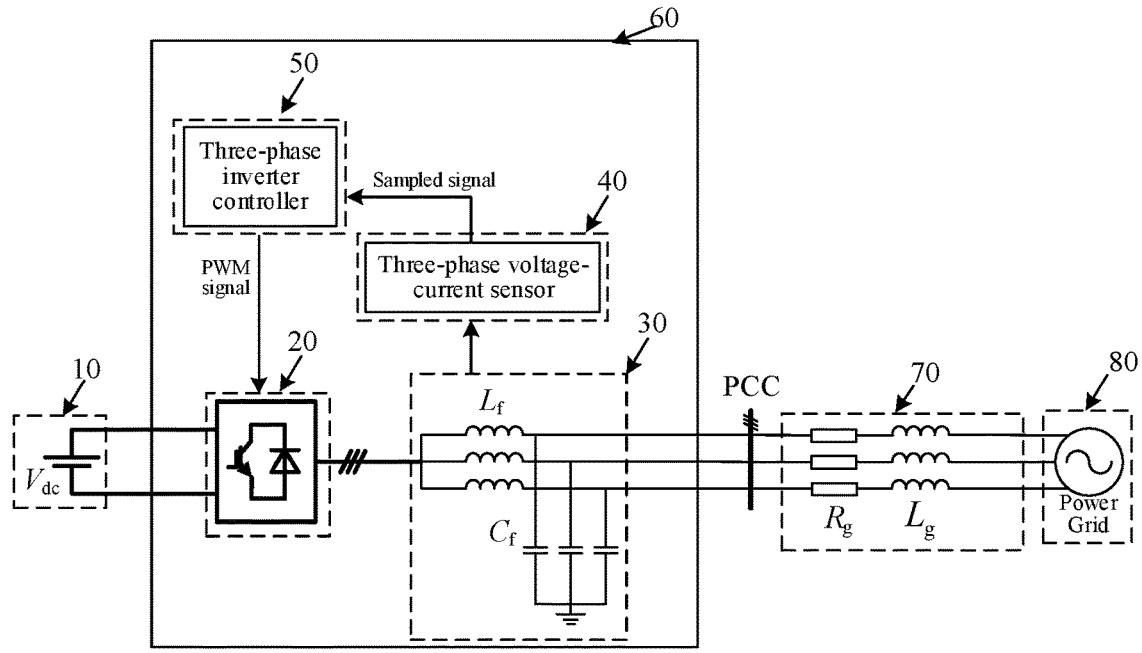
FIG. 1 is a topological graph of a main circuit for a VSG and an inverter according to the present disclosure.

FIG. 1 is a topological graph of a main circuit for a VSG and an inverter according to the present disclosure. As shown in FIG. 1, a topological structure of the VSG using the control method of the present disclosure includes a DC-side voltage source 10, a three-phase inverter 60, a three-phase grid impedance 70 and a three-phase grid 80, where the DC-side voltage source 10 is connected to the three-phase inverter 60, and the three-phase inverter 60 is connected to the three-phase grid 80 through the three-phase grid impedance 70; the three-phase inverter 60 is composed of a three-phase full-bridge inverter circuit 20, a three-phase LC filter 30, a three-phase voltage-current sensor 40, and a three-phase inverter controller 50; the three-phase full-bridge inverter circuit 20 is connected to the three-phase LC filter 30; the three-phase voltage-current sensor 40 samples three-phase voltages of a filter capacitance and three-phase currents of a filter inductance in the three-phase LC filter 30, and transmits a sampled signal to the three-phase inverter controller 50; and the three-phase inverter controller 50 performs control and computation, and outputs a PWM signal to control the three-phase full-bridge inverter circuit 20.

In FIG. 1, $V_{dc}$ is the DC-side voltage of the DC-side voltage source 10, $L_f$ is the bridge arm side inductance of the three-phase LC filter 30, $C_f$ is the filter capacitance in the three-phase LC filter 30, $R_g$ is the resistance in the three-phase grid impedance 70, $L_g$ is the inductance in the three-phase grid impedance 70, Grid is the three-phase grid 80, and PCC is a point of common coupling.

In the embodiment, the main circuit of the inverter involves the following parameters: The DC-side voltage $V_{dc}$ is 800 V, the rated output line voltage of the inverter is 380 V/50 Hz, the rated power of the inverter is 100 kW, the inverter-side filter capacitance $C_f$ has a capacitance of 270 uF, the inverter-side filter inductance $L_f$ has an inductance of 0.56 mH, the three-phase grid impedance has an inductance of $L_g$=0.6 mH, and the three-phase grid has a resistance of $R_g$=0.05Ω.

The stability control method for a VSG in a strong grid based on an inductance-current differential feedback includes a round of computation for controlling the VSG and a round of computation for controlling the inductance-current differential feedback in each computation cycle $T_{compute}$ of the three-phase inverter controller 50, $T_{compute}=1/f_{compute}$, $f_{compute}$ being a computed frequency of the three-phase inverter controller 50. In the embodiment, $f_{compute}$=5000 Hz.

The round of computation for controlling the VSG and the round of computation for controlling the inductance-current differential feedback include the following steps:

Step 1: Respectively label the capacitance and the inductance in the three-phase LC filter 30 as an inverter-side filter capacitance and an inverter-side filter inductance, where the three-phase voltage-current sensor 40 samples the three-phase voltages $U_a$, $U_b$, $U_c$ of the inverter-side filter capacitance and the three-phase currents $I_{La}$, $I_{Lb}$, $I_{Lc}$ inverter-side filter inductance, and transmits the sampled signal to the three-phase inverter controller 50.

Step 2: Obtain, by the three-phase inverter controller 50, according to the three-phase voltages $U_a$, $U_b$, $U_c$ of the inverter-side filter capacitance in Step 1, two-phase voltages $U_\alpha$, $U_\beta$ of the inverter-side filter capacitance in a static coordinate system through an equation for transforming the voltages in a three-phase static coordinate system into the voltages in a two-phase static coordinate system; and obtain, by the three-phase inverter controller, according to the three-phase currents $I_{La}$, $I_{Lb}$, $I_{Lc}$ of the inverter-side filter inductance in Step 1, two-phase currents $I_{L\alpha}$, $I_{L\alpha}$ of the inverter-side filter inductance in the static coordinate system according to an equation for transforming the currents in the three-phase static coordinate system into the currents in the two-phase static coordinate system.

The equation for transforming the voltages in the three-phase static coordinate system into the voltages in the two-phase static coordinate system is:

$$\begin{bmatrix} U_\alpha \\ U_\beta \end{bmatrix} = \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} U_a \\ U_b \\ U_c \end{bmatrix}$$

The equation for transforming the currents in the three-phase static coordinate system into the currents in the two-phase static coordinate system is:

$$\begin{bmatrix} I_{L\alpha} \\ I_{L\beta} \end{bmatrix} = \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} I_{La} \\ I_{Lb} \\ I_{Lc} \end{bmatrix}.$$

Step 3: Obtain, by the three-phase inverter controller 50, according to the two-phase voltages $U_\alpha$, $U_\beta$ of the inverter-side filter capacitance in the static coordinate system and the two-phase currents $I_{L\alpha}$, $I_{L\beta}$ of the inverter-side filter inductance in the static coordinate system in Step 2, an output active power P of the three-phase inverter and an output reactive power Q of the three-phase inverter through an equation for computing an instantaneous power.

The equation for computing the instantaneous power is:

$$P = U_\alpha I_{L\alpha} + U_\beta I_{L\beta}$$

$$Q = U_\beta I_{L\alpha} - U_\alpha I_{L\beta}$$

Step 4: Label a reactive power axis as a q-axis and an active power axis as a d-axis; and obtain, by the three-phase inverter controller 50, according to the two-phase voltages $U_\alpha$, $U_\beta$ of the inverter-side filter capacitance in the static coordinate system in Step 2, a d-axis voltage $U_d$ of the inverter-side filter capacitance and a q-axis voltage $U_q$ of the inverter-side filter capacitance through an equation for transforming the voltages in the two-phase static coordinate system into the voltages in a two-phase rotating coordinate system, and obtain a phase angle $\theta_{PLL}$ of an A-phase voltage of the inverter-side filter capacitance through a phase-locked equation of a phase-locked loop (PLL) in a single synchronous coordinate system.

The equation for transforming the voltages in the two-phase static coordinate system into the voltages in the two-phase rotating coordinate system is:

$$U_d = \cos(\theta_{PLL\_Last}) \times U_\alpha + \sin(\theta_{PLL\_Last}) \times U_\beta$$

$$U_q = \sin(\theta_{PLL\_Last}) \times U_\alpha + \cos(\theta_{PLL\_Last}) \times U_\beta$$

The phase-locked equation of the PLL in the single synchronous coordinate system in Step 4 is:

$$\theta_{PLL} = U_q \times \left( k_{p\_PLL} + \frac{k_{i\_PLL}}{s} \right) \times \frac{1}{s}$$

where, $\theta_{PLL\_Last}$ is a phase angle of an A-phase voltage of the inverter-side filter capacitance obtained through the phase-locked equation of the PLL in the single synchronous coordinate system in a last computation cycle, $k_{p\_PLL}$ is a coefficient of a proportional controller for the PLL in the single synchronous coordinate system, and $k_{i\_PLL}$ is a coefficient of an integral controller for the PLL in the single synchronous coordinate system. In the embodiment, $k_{p\_PLL} = 1.0637$, and $k_{i\_PLL} = 176.0135$.

Step 5: Obtain, by the three-phase inverter controller 50, according to the output active power P of the three-phase inverter in Step 3, an angle $\theta_m$ of a modulated wave output from the VSG, through an equation for computing an active power loop; and obtain, by the three-phase inverter controller 50, according to the output reactive power Q of the three-phase inverter in Step 3 and the d-axis voltage $U_d$ of the inverter-side filter capacitance in Step 4, an amplitude $U_{m\_VSG}$ of the modulated wave output from the VSG, through an equation for calculating a reactive power loop.

The equation for computing the active power loop is:

$$\theta_m = \frac{P_{set} - P + \omega_n^2 D_p}{J \omega_n s^2 + \omega_n D_p s}$$

The equation for computing the reactive power loop is:

$$U_{m\_VSG} = \frac{1}{K_q \times s} [D_q \times (U_{nAmp} - U_d) + (Q_{set} - Q)]$$

where, $P_{set}$ is a set value of the output active power of the three-phase inverter, $\omega_n$ is a rated angular frequency of the three-phase grid 80, $D_p$ is a frequency droop coefficient of the VSG, J is a virtual rotational inertia of the VSG, $U_{nAmp}$ is a rated phase voltage amplitude of the three-phase grid 80, $Q_{set}$ is a set value of the output reactive power of the three-phase inverter, $D_q$ is a voltage droop coefficient of the VSG, $K_q$ is an inertia coefficient for controlling the reactive power, and s is a Laplace operator. In the embodiment, $P_{set} = 100$ kW, $\omega_n = 314.1593$ rad/s, $D_p = 50$, $J = 0.057$ kg×m², $U_{nAmp} = 311.08$V, $Q_{set} = 0$ Var, $D_q = 3210$, and $K_q = 120$.

Step 6: Obtain, by the three-phase inverter controller 50, according to the amplitude $U_{m\_VSG}$ of the modulated wave output from the VSG and the angle $\theta_m$ of the modulated wave output from the VSG in Step 5, output three-phase modulation voltages $U_{mA\_VSG}$, $U_{mB\_VSG}$, $U_{mC\_VSG}$ of the VSG through an equation for computing the modulated wave of the VSG.

The equation for computing the modulated wave of the VSG is:

$$U_{mA\_VSG} = U_{m\_VSG} \times \cos(\theta_m)$$

$$U_{mB\_VSG} = U_{m\_VSG} \times \cos\left(\theta_m - \frac{2}{3}\pi\right)$$

$$U_{mC\_VSG} = U_{m\_VSG} \times \cos\left(\theta_m + \frac{2}{3}\pi\right)$$

Figure 2:
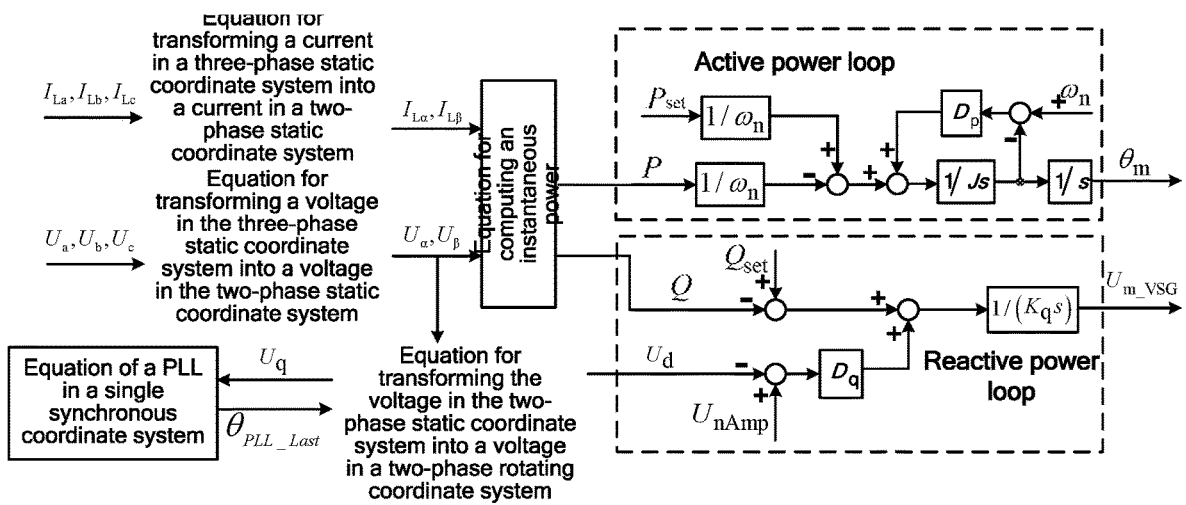
FIG. 2 is a control block diagram of a VSG according to the present disclosure.

The above describes the steps in the computation for controlling the VSG. FIG. 2 illustrates the control block diagram of the computation for controlling the VSG.

Step 7: Obtain, by the three-phase inverter controller 50, according to the three-phase currents $I_{La}$, $I_{Lb}$, $I_{Lc}$ of the inverter-side filter inductance in Step 1, increments $\Delta U_{mA}$, $\Delta U_{mB}$, $\Delta U_{mC}$ of the three-phase modulation voltages due to a virtual series-connection inductance through an equation for computing the inductance-current differential feedback, the equation for computing the inductance-current differential feedback being:

$$\Delta U_{mA} = -sL_{vir}I_{La}$$

$$\Delta U_{mB} = -sL_{vir}I_{Lb}$$

$$\Delta U_{mC} = -sL_{vir}I_{Lc}$$

where, $L_{vir}$ is the virtual series-connection inductance.

Step 8: Compute, by the three-phase inverter controller 50, according to the output three-phase modulation voltages $U_{mA\_VSG}$, $U_{mB\_VSG}$, $U_{mC\_VSG}$ of the VSG in Step 6 and the increments $\Delta U_{mA}$, $\Delta U_{mB}$, $\Delta U_{mC}$ of the three-phase modulation voltages due to the virtual series-connection inductance in Step 7, output three-phase modulation voltages $U_{mA}$, $U_{mB}$, $U_{mC}$ of the three-phase inverter with a following computational equation:

$$U_{mA} = U_{mA\_VSG} + \Delta U_{mA}$$

$$U_{mB} = U_{mB\_VSG} + \Delta U_{mB}$$

$$U_{mC} = U_{mC\_VSG} + \Delta U_{mC}$$

Figure 3:
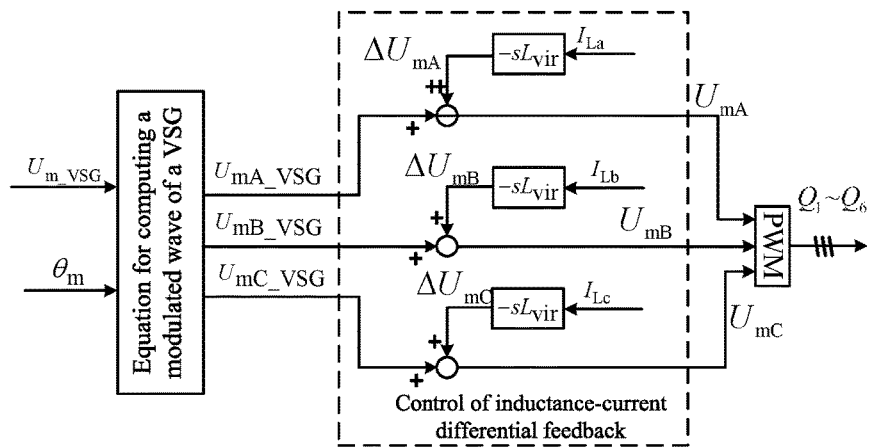
FIG. 3 is a control block diagram of an inductance-current differential feedback according to the present disclosure.

Step 7 to Step 8 show the computation for controlling the inductance-current differential feedback. FIG. 3 illustrates the control block diagram of the computation for controlling the inductance-current differential feedback.

Step 9: Control, by the three-phase inverter controller 50, according to the output three-phase modulation voltages $U_{mA}$, $U_{mB}$, $U_{mC}$ of the three-phase inverter in Step 8, transmission of a PWM modulated wave and outputting the PWM signal, and control the three-phase full-bridge inverter circuit 20 through the PWM signal to transmit output electrical energy of the three-phase inverter to the three-phase grid 80.

Figure 4:
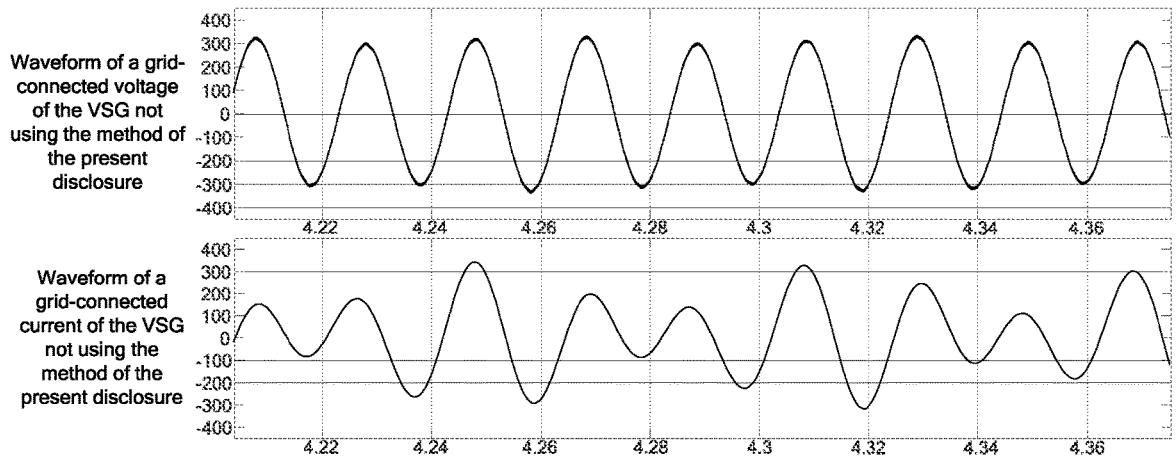
FIG. 4 illustrates waveforms of a grid-connected voltage and a grid-connected current of a VSF not using the method of the present disclosure in a strong grid.

FIG. 4 illustrates waveforms of a grid-connected voltage and a grid-connected current of a VSF not using the method of the present disclosure in a strong grid. As can be seen from FIG. 4, both the grid-connected voltage and the grid-connected current are oscillating, indicating that the VSG not controlled with the inductance-current differential feedback cannot operate stably in the strong grid.

Figure 5:
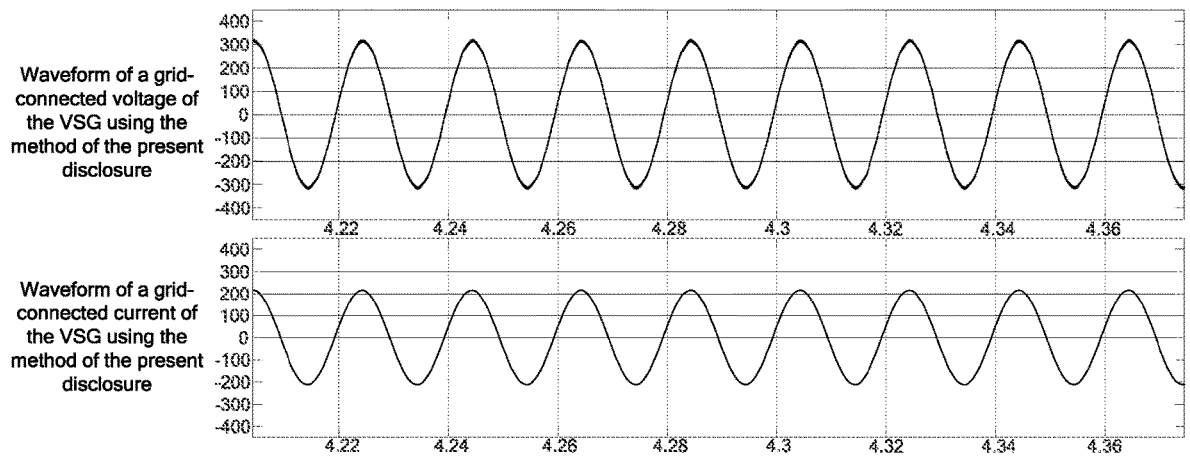
FIG. 5 illustrates waveforms of a grid-connected voltage and a grid-connected current of a VSF using the method of the present disclosure in a strong grid.

FIG. 5 illustrates waveforms of a grid-connected voltage and a grid-connected current of a VSF using the method of the present disclosure in a strong grid. As can be seen from FIG. 5, both the grid-connected voltage and the grid-connected current are not oscillating, with good waveforms. It is indicated that the VSG can operate stably in the strong power grid through the stability control method for a virtual synchronous generator in a strong grid based on an inductance-current differential feedback.

What is claimed is:

1. A stability control method for a virtual synchronous generator (VSG) in a strong grid based on an inductance-current differential feedback, wherein
  a topological structure of a VSG using the control method comprises a direct-current (DC)-side voltage source, a three-phase inverter, a three-phase grid impedance and a three-phase grid;
  the DC-side voltage source is connected to the three-phase inverter, and the three-phase inverter is connected to the three-phase grid through the three-phase grid impedance;
  the three-phase inverter is composed of a three-phase full-bridge inverter circuit, a three-phase inductance-capacitance (LC) filter, a three-phase voltage-current sensor, and a three-phase inverter controller;
  the three-phase full-bridge inverter circuit is connected to the three-phase LC filter;
  the three-phase voltage-current sensor samples three-phase voltages of a filter capacitance and three-phase currents of a filter inductance in the three-phase LC filter, and transmits a sampled signal to the three-phase inverter controller; and
  the three-phase inverter controller performs control and computation, and outputs a pulse width modulation (PWM) signal to control the three-phase full-bridge inverter circuit;
  the stability control method in the strong grid comprises a round of computation for controlling the VSG and a round of computation for controlling the inductance-current differential feedback in each computation cycle $T_{compute}$ of the three-phase inverter compute controller, wherein $T_{compute}=1/f_{compute}$, and $f_{compute}$ is a computed frequency of the three-phase inverter controller; and
  the round of computation for controlling the VSG and the round of computation for controlling the inductance-current differential feedback comprise the following steps:
  step 1: respectively labeling the filter capacitance and the filter inductance in the three-phase LC filter as an inverter-side filter capacitance and an inverter-side filter inductance, wherein the three-phase voltage-current sensor samples the three-phase voltages $U_a$, $U_b$, $U_c$ of the inverter-side filter capacitance and the three-phase currents $I_{La}$, $I_{Lb}$, $I_{Lc}$ of the inverter-side filter inductance, and transmits a sampled signal to the three-phase inverter controller;
  step 2: obtaining, by the three-phase inverter controller, according to the three-phase voltages $U_a$, $U_b$, $U_c$ of the inverter-side filter capacitance in step 1, two-phase voltages $U_\alpha$, $U_\beta$ of the inverter-side filter capacitance in a static coordinate system through an equation for transforming voltages in a three-phase static coordinate system into voltages in a two-phase static coordinate system; and obtaining, by the three-phase inverter controller, according to the three-phase currents $I_{La}$, $I_{Lb}$, $I_{Lc}$ of the inverter-side filter inductance in step 1, two-phase currents $I_{L\alpha}$, $I_{L\beta}$ of the inverter-side filter inductance in the static coordinate system according to an equation for transforming currents in the three-phase static coordinate system into currents in the two-phase static coordinate system;
  step 3: obtaining, by the three-phase inverter controller, according to the two-phase voltages $U_\alpha$, $U_\beta$ of the inverter-side filter capacitance in the static coordinate system and the two-phase currents $I_{L\alpha}$, $I_{L\beta}$ of the inverter-side filter inductance in the static coordinate system in step 2, an output active power P of the three-phase inverter and an output reactive power Q of the three-phase inverter through an equation for computing an instantaneous power,
  the equation for computing the instantaneous power being:

$P=U_\alpha I_{L\alpha}+U_\beta I_{L\beta}$ $Q=U_\beta I_{L\alpha}-U_\alpha I_{L\beta}$ step 4: labeling a reactive power axis as a q-axis and an active power axis as a d-axis; and obtaining, by the three-phase inverter controller, according to the two-phase voltages $U_\alpha$, $U_\beta$ of the inverter-side filter capacitance in the static coordinate system in step 2, a d-axis voltage $U_d$ of the inverter-side filter capacitance and a q-axis voltage $U_q$ of the inverter-side filter capacitance through an equation for transforming the voltages in the two-phase static coordinate system into voltages in a two-phase rotating coordinate system, and obtaining a phase angle $\theta_{PLL}$ of an A-phase voltage of the inverter-side filter capacitance through a phase-locked equation of a phase-locked loop (PLL) in a single synchronous coordinate system;
  step 5: obtaining, by the three-phase inverter controller, according to the output active power P of the three-phase inverter in step 3, an angle $\theta_m$ of a modulated wave output from the VSG through an equation for computing an active power loop; and obtaining, by the three-phase inverter controller, according to the output reactive power Q of the three-phase inverter in step 3 and the d-axis voltage $U_d$ of the inverter-side filter capacitance in step 4, an amplitude $U_{m\_VSG}$ of the modulated wave output from the VSG through an equation for calculating a reactive power loop,
  the equation for computing the active power loop being:

$$\theta_m = \frac{P_{set} - P + \omega_n^2 D_p}{J\omega_n s^2 + \omega_n D_p s}$$

the equation for computing the reactive power loop being:

$$U_{m\_VSG} = \frac{1}{K_q \times s}[D_q \times (U_{nAmp} - U_d) + (Q_{set} - Q)]$$

wherein, $P_{set}$ is a set value of the output active power of the three-phase inverter, $\omega_n$ is a rated angular frequency of the three-phase grid, $D_p$ is a frequency droop coefficient of the VSG, $J$ is a virtual rotational inertia of the VSG, $U_{nAmp}$ is a rated phase voltage amplitude of the three-phase grid, $Q_{set}$ is a set value of the output reactive power of the three-phase inverter, $D_q$ is a voltage droop coefficient of the VSG, $K_q$ is an inertia coefficient for controlling the reactive power, and S is a Laplace operator;

step 6: obtaining, by the three-phase inverter controller, according to the amplitude $U_{m\_VSG}$ of the modulated wave output from the VSG and the angle $\theta_m$ of the modulated wave output from the VSG in step 5, output three-phase modulation voltages $U_{mA\_VSG}$, $U_{mB\_VSG}$, $U_{mC\_VSG}$ of the VSG through an equation for computing the modulated wave of the VSG, the equation for computing the modulated wave of the VSG being:

$$U_{mA\_VSG} = U_{m\_VSG} \times \cos(\theta_m)$$

$$U_{mB\_VSG} = U_{m\_VSG} \times \cos\left(\theta_m - \frac{2}{3}\pi\right)$$

$$U_{mC\_VSG} = U_{m\_VSG} \times \cos\left(\theta_m + \frac{2}{3}\pi\right)$$

step 7: obtaining, by the three-phase inverter controller, according to the three-phase currents $I_{La}$, $I_{Lb}$, $I_{Lc}$ of the inverter-side filter inductance in step 1, increments $\Delta U_{mA}$, $\Delta U_{mB}$, $\Delta U_{mC}$ of the output three-phase modulation voltages caused by a virtual series-connection inductance through an equation for computing the inductance-current differential feedback, the equation for computing the inductance-current differential feedback being:

$$\Delta U_{mA} = -sL_{vir}I_{La}$$

$$\Delta U_{mB} = -sL_{vir}I_{Lb}$$

$$\Delta U_{mC} = -sL_{vir}I_{Lc}$$

wherein, $L_{vir}$ is the virtual series-connection inductance;

step 8: computing, by the three-phase inverter controller, according to the output three-phase modulation voltages $U_{mA\_VSG}$, $U_{mB\_VSG}$, $U_{mC\_VSG}$ of the VSG in step 6 and the increments $\Delta U_{mA}$, $\Delta U_{mB}$, $\Delta U_{mC}$ of the output three-phase modulation voltages caused by the virtual series-connection inductance in step 7, output three-phase modulation voltages $U_{mA}$, $U_{mB}$, $U_{mC}$ of the three-phase inverter through a following computational equation:

$$U_{mA} = U_{mA\_VSG} + \Delta U_{mA}$$

$$U_{mB} = U_{mB\_VSG} + \Delta U_{mB}$$

$$U_{mC} = U_{mC\_VSG} + \Delta U_{mC}, \text{ and}$$

step 9: controlling, by the three-phase inverter controller, according to the output three-phase modulation voltages $U_{mA}$, $U_{mB}$, $U_{mC}$ of the three-phase inverter in step 8, transmission of a PWM modulated wave and outputting a PWM signal, and controlling the three-phase full-bridge inverter circuit through the PWM signal to transmit output electrical energy of the three-phase inverter to the three-phase grid.

2. The stability control method for the VSG in the strong grid based on the inductance-current differential feedback according to claim 1, wherein the equation for transforming the voltages in the three-phase static coordinate system into the voltages in the two-phase static coordinate system in step 2 is:

$$\begin{bmatrix} U_\alpha \\ U_\beta \end{bmatrix} = \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} U_a \\ U_b \\ U_c \end{bmatrix},$$

and the equation for transforming the currents in the three-phase static coordinate system into the currents in the two-phase static coordinate system in step 2 is:

$$\begin{bmatrix} I_{L\alpha} \\ I_{L\beta} \end{bmatrix} = \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} I_{La} \\ I_{Lb} \\ I_{Lc} \end{bmatrix}.$$

3. The stability control method for the VSG in the strong grid based on the inductance-current differential feedback according to claim 1, wherein the equation for transforming the voltages in the two-phase static coordinate system into the voltages in the two-phase rotating coordinate system in step 4 is:

$$U_d = \cos(\theta_{PLL\_Last}) \times U_\alpha + \sin(\theta_{PLL\_Last}) \times U_\beta$$

$$U_q = -\sin(\theta_{PLL\_Last}) \times U_\alpha + \cos(\theta_{PLL\_Last}) \times U_\beta, \text{ and}$$

the phase-locked equation of the PLL in the single synchronous coordinate system in step 4 is:

$$\theta_{PLL} = U_q \times \left(k_{p\_PLL} + \frac{k_{i\_PLL}}{s}\right) \times \frac{1}{s}$$

wherein, $\theta_{PLL\_Last}$ is a phase angle of an A-phase voltage of the inverter-side filter capacitance obtained through the phase-locked equation of the PLL in the single synchronous coordinate system in a last computation cycle, $k_{p\_PLL}$ is a coefficient of a proportional controller for the PLL in the single synchronous coordinate system, and $k_{i\_PLL}$ is a coefficient of an integral controller for the PLL in the single synchronous coordinate system.

* * * * *